United States Patent
Sommer et al.

(10) Patent No.: US 6,522,957 B1
(45) Date of Patent: Feb. 18, 2003

(54) METHOD AND DEVICE FOR CONTROLLING PROCESSES IN A VEHICLE

(75) Inventors: Rainer Sommer, Stuttgart (DE); Markus Stober, Schwieberdingen (DE); Taskin Ege, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,857
(22) PCT Filed: Sep. 9, 2000
(86) PCT No.: PCT/DE00/03134
§ 371 (c)(1), (2), (4) Date: Aug. 31, 2001
(87) PCT Pub. No.: WO01/27769
PCT Pub. Date: Apr. 19, 2001

(30) Foreign Application Priority Data

Oct. 11, 1999 (DE) .......................................... 199 49 048

(51) Int. Cl.⁷ ................................................. G06F 7/00
(52) U.S. Cl. ........................................................ 701/1
(58) Field of Search ............................... 701/1, 33, 35, 701/36

(56) References Cited

U.S. PATENT DOCUMENTS 4,908,792 A 3/1990 Przybyla et al. ............ 364/900

FOREIGN PATENT DOCUMENTS

DE 197 12 731 10/1997

OTHER PUBLICATIONS

Al–Riahi, *Software–controlled memory duplication*, Microprocessors and Microsystems, Jan. 1985, vol. 9, No. 1, pp. 21–23.

K. Baker, *Interbank Function Calling in ROM Banks*, Electronic Design, Penton Publishing, Cleveland, OH., Jan. 22, 1996, vol. 44, No. 2, pp. 124–126.

*Primary Examiner*—Yonel Beaulieu
(74) *Attorney, Agent, or Firm*—Kenyon & Kenyon

(57) ABSTRACT

Method and device for controlling a process in a vehicle, in particular for controlling a drive in the vehicle, using at least one processor. Control functions are stored in the form of program code in a processor-addressable address space of at least one memory. The address space is divided into segments of equal length, and the program code is stored as program parts per control function in individual, consecutive sections in the segment. At least two segments are linked so that a section of a first segment is programmed as an exit label from the first segment, and a second section in the second segment is programmed as an entry label to the second segment. A transition from the exit label of the first segment to the entry label of the second segment brackets the code segments and thus expands the possible segment area.

10 Claims, 2 Drawing Sheets

METHOD AND DEVICE FOR CONTROLLING PROCESSES IN A VEHICLE

FIELD OF THE INVENTION

The present invention relates to a method and a device for controlling processes in a vehicle, in particular for controlling a drive in a vehicle.

BACKGROUND INFORMATION

The address spaces of popular computers are divided into multiple segments of equal size, for example 64 kilobytes. While a program is running, it is possible to use an explicit command to switch from one code segment to the next following interrupt processing. For example, the individual functions of an engine controller are programmed as program parts, known as program sections, on pages 3–4 and 9–4 of the 80166 Cross-Assembler User's Guide by Tasking Software B. V. These program parts are divided into consecutive sections for each interrupt or computing level. There is no jump instruction for switching from one section to the next. Therefore, the sectioned program parts are located in the same segment for the program code.

Based on the related art cited, different engine control functions can be implemented as subroutines, and these subroutines can be called in one or more sectioned program sequences. The actual comprehensive program code is thus located in an unspecified segment, and only the small subroutine calls need to fit into the code segment, i.e., program segment (of 64 kilobytes in size, for example) in which the remaining sectioned program parts of related engine controller control functions are located.

It has been found that the related art cited is unable to supply optimum results in every situation. Thus, even when using the subroutine calls, the latter and any additional sectioned program parts of related engine functions have to be arranged within the same code segment. In the case of powerful controllers, in particular those used to control processes in conjunction with an internal combustion engine, the code segment limit of 64 kilobytes, for example, is exceeded by various computing levels.

Even simply expanding existing functions by adding additional sections that contain program code, i.e., program parts, of recently added control functions quickly run up against or even exceed the existing code segment limit. As the central processing unit (CPU) uses 16-bit internal addressing, for example, it is not possible to expand the segments to any desired size, and thus increase the scope of the program code and control functions.

The object is therefore to link program code, i.e., program parts, belonging to related control functions, even if the latter exceed the maximum possible segment limit of 64 kilobytes, for example, when using 2 to the power of 16-bit addressability.

This problem naturally arises even in the case of larger and smaller code segments, such as when using 4, . . . , 8, . . . , 12, . . . , 16, . . . , 24, . . . , or 32-bit addressability.

SUMMARY OF THE INVENTION

The present invention describes a method and device for controlling processes in a vehicle, in particular for controlling a drive in a vehicle, using at least one processor, with the control functions being stored the form of program code in a processor-addressable address space in at least one memory; the address space being divided into segments of equal length; and the program code in program parts of each control function being stored in individual, consecutive sections in the segment. To allow related control functions, i.e., their program code, to exceed the maximum segment size, at least two segments are advantageously linked so that a section of a first segment contains an exit label, i.e., an exit instruction or an exit routine (i.e., program sequence) from the first segment, and a second section in the second segment contains an entry label, i.e., an entry instruction or an entry routine (i.e., program sequence), and the entry and exit labels are linked with each other in a way that provides a transition from the first segment to the second one. By bracketing at least two code segments in this manner, it is possible to use related control functions, i.e., their program code, of nearly any size beyond the segment limits.

The exit label is advantageously programmed in the last section of the first segment, and/or the entry label is programmed in the first section of the second segment. In the first segment, the program code thus grows from the end to the beginning of the segment, while in the second segment, it grows in the opposite direction from the beginning to the end of the segment. The sections containing program code are therefore sequenced in the segments in reverse order, depending on the control functions, i.e., program parts, stored in them, which doubles the available segment size when bracketing two segments. This method can also be used in a suitable manner for more than two code segments, i.e., program segments, and more than one interrupt/computing level. It is also unnecessary for the code segments in question to be arranged consecutively in the address space.

The segments do not necessarily have to be stored in the same memory area or the same memory. This segmentation has to do with processor addressability. This means that the processor addresses an address space that can include at least one physical memory, but also several different ones, thus defining its own separate virtual memory. Due to processor addressability, this address space, i.e., memory, is divided into segments of maximum size.

The entry label and the exit label each advantageously include a complete section in a single code segment, making it possible to easily append this section to existing sections or to easily start programming from these special sections (entry and/or exit labels) without having to take the labels (entry and/or exit labels) into consideration in the additional program code of the control functions.

All program parts or program code, i.e., the sections for the control functions, can thus be advantageously programmed and integrated using conventional software development methods without having to undergo any additional adaptation. This means that existing software modules do not have to be adapted, either. The latter can continue to be used for small systems, i.e., systems containing program code in one segment, as well as for large systems, i.e., systems that exceed the code segment limits.

Another advantage is that there is no need for iterative post-processing, such as inserting jumps and jump labels, compilation, assembly, testing, etc., of possibly two or more control functions per program version. Furthermore, iterative conversion of control functions to subroutines or the like, as in the related art, is suitably eliminated, which means there is no need for retesting or rechecking the program version.

All advantages of sectioning, as opposed to a pure subroutine method, can thus remain intact, such as modular programming and minimizing computing runtime and program storage space, which, in the end, lowers development and controller costs.

It is therefore possible to advantageously influence the distribution of program code to the code segments exclusively during software integration. It has no effect on the software module implementation process. This means that control function distribution can be defined in a controller task distribution system even before actual development, and it can also be advantageously expanded later on for a new program version.

When the expanded code segment limits are about to be exceeded, suitable linker/locator instructions can be used to ensure that unwanted limit overshooting does not inadvertently occur. In addition, adding another bracketed segment can directly avoid exceeding such limits.

DETAILED DESCRIPTION

Figure 1:
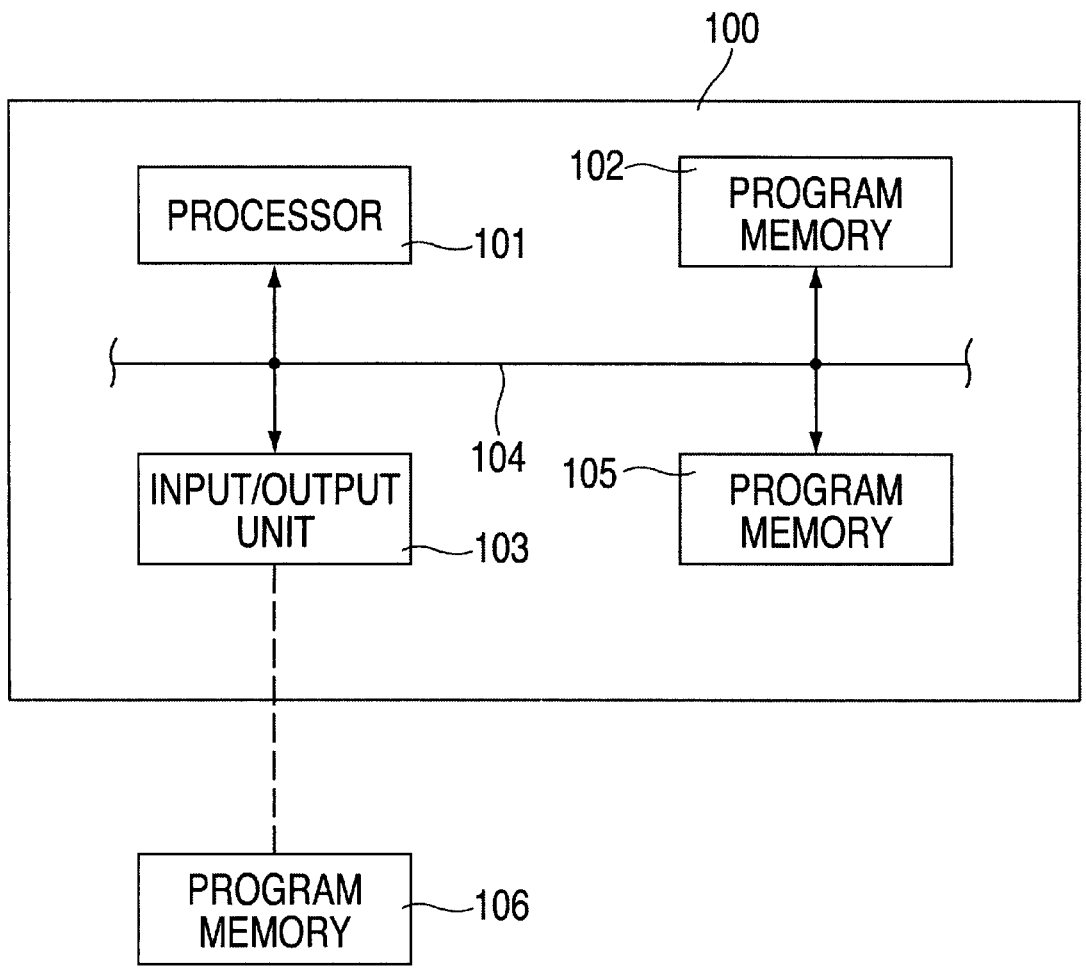
FIG. 1 shows the components in a controller needed for illustrating the present invention, including a central processing unit and at least one memory.

In FIG. 1, reference number 100 designates a controller to which are sent signals that represent measured operating quantities of the drive unit, power train, and/or vehicle or from which such operating quantities can be derived, using illustrated input/output unit 103. In particular, these are operating quantities that can be evaluated to control a drive unit, in particular of an internal combustion engine. This unit 103 is also used to output signals that operate control elements, i.e., actuators, to set at least one vehicle operating quantity, in particular that of a drive unit. This input/output unit 103 can also be designed as two separate units, namely an input unit and an output unit.

As a function of the input signals, operating quantities and/or internal quantities derived from these signals, processor unit 101 generates values for the output control quantities to be output that set the control element according to a preset open-loop or closed-loop control strategy, within the scope of programs implemented in at least one memory 102, i.e., control functions in the form of program code. Control unit 100 can be used for transmission control, chassis control (ABS, ASC, ESP, etc.), in particular brake, convenience and safety electronics control, etc.

However, because controller 100 is preferably a control unit for controlling a drive unit, in particular that of an internal combustion engine of a vehicle, the position of a control element operated by the driver is detected and evaluated in the known manner, and a setpoint is determined for a torque of the drive unit. This results in the determination of a setpoint, e.g., for the torque, taking into account setpoints of other control systems received via input/output unit 103, including an anti-spin control system, a transmission control system, etc. as well as setpoints generated internally (limits, etc.). According to the preferred embodiment of an internal combustion engine controller, these setpoints are then converted to a setpoint for the throttle valve position set by a position control circuit. Depending on the configuration of the internal combustion engine, additional performance-determining functions are also provided, for example controlling a turbocharger of an exhaust gas recirculator, idle speed controller, etc.

Furthermore, in the case of internal combustion engines with direct gasoline injection, not only the air setting but also the determination of fuel volume to be injected, determination of an air/fuel ratio to be set, the specification of the injection cycle (pilot injection, secondary injection), control of a charge circulation valve, etc. determine performance, so that a plurality of other programs, i.e., control functions, that affect the performance of the internal combustion engine—and thus vehicle safety—are provided in addition to the ones illustrated.

In addition to using the present invention for drive control, it is also conceivable to apply it to all other vehicle processes, as mentioned above. As described in relation to the internal combustion engine controller, this means that other control processes are conceivable, such as chassis control processes, in particular the brake, transmission, convenience electronics (such as window actuators and door locks), etc.

This plurality of control functions, i.e., programs, is stored in or can be loaded into respective program memories 102 and 105 or 106, respectively, in the form of program code. For example, memory 102 can be a nonvolatile memory and memory 105 a volatile one. These memories 102, 105, as well as input/output unit 103 and central processing unit (CPU) 101 are linked by an internal bus system 104. Optionally, additional components and/or units can be connected to bus system 104. These additional optional elements can be, for example, additional storage elements, additional input/output interfaces, additional central processing units, etc. Memory 106 is optional and external to controller 100, and it can be located, for example, in a further control unit, an intelligent sensor, a signal processor, etc.

Processor 101 uses internal addressing an autoincrement of a certain number of bits. This internal addressing function sets the size of the code segments in the individual memories addressable by CPU 101. An autoincrement of 16 bits, for example, thus yields a 64K code segment. Even when using higher bit numbers for addressing, i.e., larger code segments, the failure of the present segment size to match the new scope of control functions, thus exceeding it, repeatedly occurs during the course of development. This situation occurs with increasing frequency due to the addition of new control functions and function scopes. More and more related functions, such as a function I (lambda control), a function 2 (ignition calculation with ignition angle and knock control), a function 3 (start) with ever more complex hierarchical levels or subordinate functions, exceed the specified code segment limits. This results in a nearly unlimited degree of complexity and hierarchical depth for these functions.

The segments do not necessarily have to be stored in the same memory area or the same memory. This segmentation has to do with processor addressability. This means that the processor addresses an address space that can include at least one physical memory, but also several different physical memories 102, 105, 106, thus defining its own separate, virtual memory. Due to processor addressability, this address space, i.e., memory, is divided into segments. As a consequence of bracketing individual (at least two) segments, the entry and exit labels can be programmed in the same memory. The interface is thus advantageously located in the same memory, as shown in FIG. 2.

Figure 2:
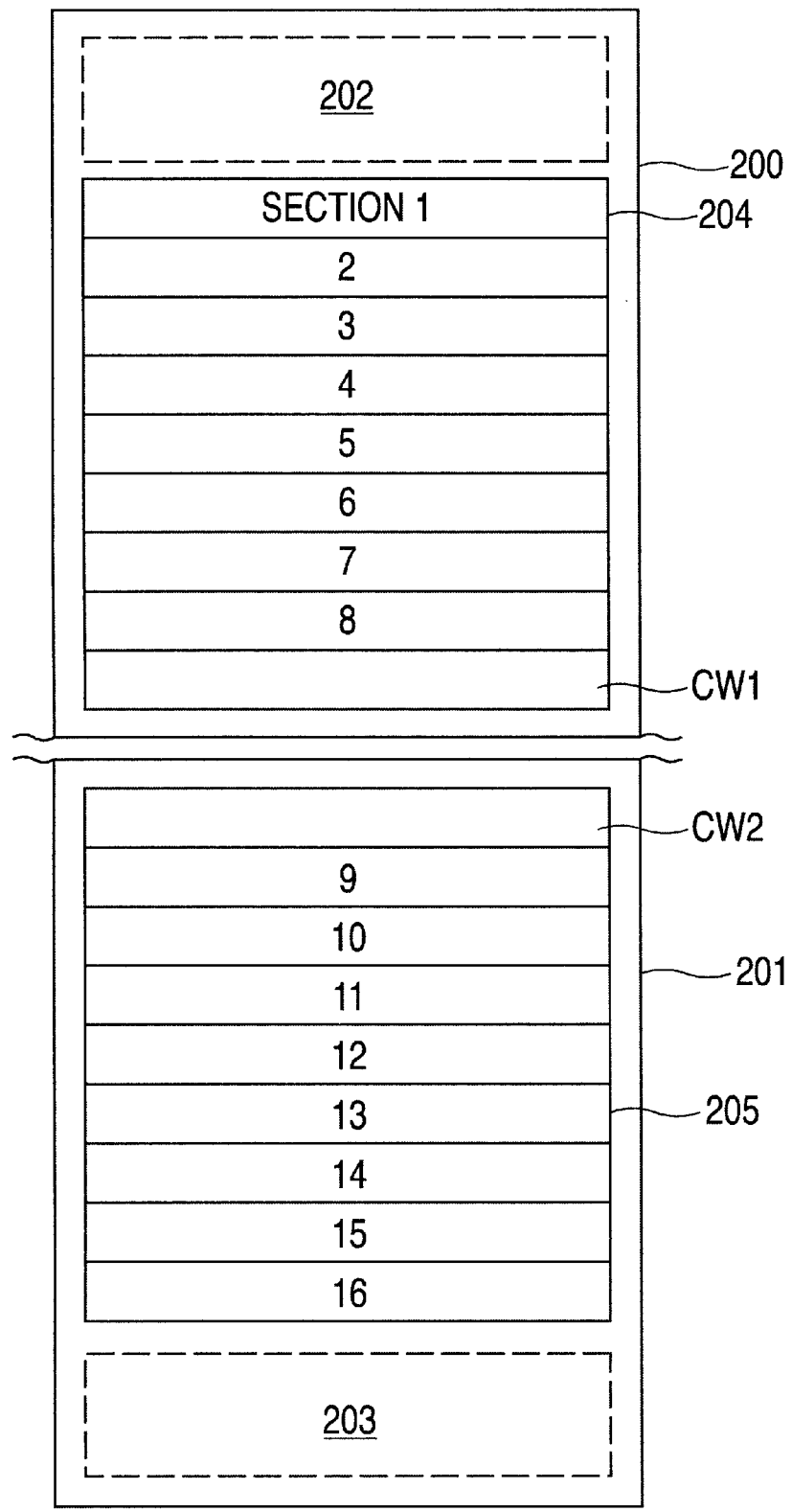
FIG. 2 shows two segments in at least one memory that are bracketed by the labels according to the present invention.

FIG. 2 now shows an arrangement for achieving this object according to the present invention. Reference number 200 designates a first code segment in a first memory, for example 102. Reference number 201 represents a second code segment, i.e., segment, in either the same memory or another memory, for example 105 or 106. Sections containing program code of the control functions are arranged consecutively in the segments. In the case of comprehensive functions, the relevant function can also overlay one or more sections, depending on the hierarchical depth. The consecutive sections in a first segment are shown in block 204 in segment 200. The storage space not yet occupied by sections is a free memory 202, illustrated by a broken line, and also located in code segment 200. Depending on the direction in which the memory is programmed or written, the free memory can be located at the beginning or end.

The program code can be divided into sections either on a time level, i.e., time-synchronously, or event-synchronously, for example synchronized with speed or crankshaft. Section 1 in FIG. 2, for example, includes a function 1, for example lambda control. Sections 2, 3, and 4 can include a function 2, for example an ignition calculation. Knock control, for example, is carried out in Section 4, while the ignition angle is calculated in Section 3, and the ignition calculation coordinated in Section 2. Sections 5 through 8 contain additional control functions, i.e., the corresponding program code, e.g., a function 3 (start). If a further control function, i.e., corresponding program code, is to be added once the code segment has been completely filled—making free memory 200 illustrated by the dotted line too small or even completely unavailable for additional functions—the above-mentioned problems will arise.

To remedy this situation, CW1 represents a section that is programmed as an exit label in the first segment. Likewise, an entry label CW2 is programmed in a second segment 201, which can be located anywhere. If new control functions 9 through 16 need to be added, for example following an upgrade, they can be placed in a second code segment 201 if the number or size of the sections exceeds the storage capacity of free memory 202 for the next control function. Bracketing, i.e., linking the code segments, is achieved by exit and entry labels CW1 and CW2.

The present invention thus enables all program parts, i.e., sections, to be programmed unchanged for control functions without any jump instructions or jump labels, adding two sections that need to be programmed only once and that bracket the code segment transition, to the resulting overall system. Programming complete sections as entry and exit labels has the advantage that these jump labels, in particular jump instructions with entry and exit addresses, respectively, do not have to be included in a control function section, enabling development, i.e., task distribution, to take place flexibly without taking into account code segment limits and labels. Reference number 203 represents the free memory located in code segment 201. The consecutive sections are combined into block 205.

The labels can, of course, also be programmed together in a section with additional program code for control functions.

As shown in FIG. 2, it is especially advantageous to store the sections containing the entry and exit labels not just anywhere in corresponding code segments 200 and 201, respectively, 30 but to place section CW1 of the first segment, which contains or references the exit label, at the end of first segment 200 and section CW2 of segment 201, which contains or references the entry label, at the beginning of this segment 201, i.e., at the beginning of the second code segment. This means that what in this case is twice the code segment size is available right at the beginning, and the related control functions can be stored in the form of their program code in the first and/or second code segment, as required or desired. The program code thus grows upward in the first code segment and downward in the second one. As shown in FIG. 2, the free memory is located at the respective ends of the code segments, i.e., 202 and 203 in this case. It is therefore possible to begin with the first section (section 1 in this case), and the functions can be carried out consecutively until section 16 is reached without any jump instructions being inserted between the individual sections. Indeed, the entire range of control functions from sections 1 through 16 greatly exceeds the size of the code segment. This preserves the advantages of sectioning, like runtime advantages due to fewer jump instructions, for example in conjunction with a crash, and formation of the smallest possible function-oriented modules.

What is claimed is:

1. A method for controlling a process in a vehicle in accordance with an operation of at least one processor, comprising the steps of:

storing control functions as program code in at least one processor-addressable address space of at least one memory;

dividing the at least one address space into segments of equal length;

storing the program code in individual consecutive sections in at least one of the segments; and linking at least two of the segments so that an exit label from a first one of the segments is programmed in a first section of the first one of the segments and an entry label to a second one of the segments is programmed in a second section of the second one of the segments, wherein:

a transition takes place from the exit label of the first one of the segments to the entry label of the second one of the segments.

2. The method according to claim 1, wherein:

the process includes a drive in the vehicle.

3. The method according to claim 1, wherein:

an entirety of the first section in the first one of the segments corresponds to the exit label, an entirety of the second section in the second one of the segments corresponds to the entry label, and no control functions are stored as program code in the first section and the second section.

4. The method according to claim 1, further comprising one of the steps of:

programming the exit label in a last section; and programming the exit label in section form in an entirety of the exit label as the last section of the first one of the segments.

5. The method according to claim 1, further comprising one of the steps of:

programming the entry label in the first section; and programming the entry label in section form in an entirety of the entry label as a first section of the second one of the segments.

6. The method according to claim 1, further comprising the step of:

sequentially arranging and storing sections in the first one of the segments from an end of the first one of the segments starting with the exit label to a beginning of the first one of the segments.

7. The method according to claim 1, further comprising the step of:

sequentially arranging and storing sections in the second one of the segments from a beginning of the second one of the segments starting with the entry label to an end of the second one of the segments.

8. The method according to claim 1, wherein:
at least the first one of the segments and the second one of the segments include there between at least another segment as a space.

9. A device for controlling a process in a vehicle, comprising:
at least one memory;
at least one processor that addresses an address space in the at least one memory, wherein:
control functions are stored as program code in the address space via the at least one memory,
the address space is divided into segments of equal length, and
the program code is stored in individual consecutive sections of at least one of the segments; and
an arrangement for linking at least two of the segments so that an exit label from a first one of the segments is programmed in a first section of the first one of the segments and an entry label to a second one of the segments is programmed in a second section in the second one of the segments, wherein:
a transition occurs from the exit label of the first one of the segments to the entry label of the second one of the segments.

10. The device according to claim 9, wherein:
the process includes a drive in the vehicle.

* * * * *

UNITED STATES PATENT AND TRADEMARK OFFICE
CERTIFICATE OF CORRECTION

PATENT NO. : 6,522,957 B1
DATED : February 18, 2003
INVENTOR(S) : Rainer Sommer et al.

It is certified that error appears in the above-identified patent and that said Letters Patent is hereby corrected as shown below:

Column 4,
Line 46, change "function I" to -- function 1 --.

Column 5,
Line 60, change "respectively, 30 but" to -- respectively, but --.

Signed and Sealed this

Thirteenth Day of January, 2004

JON W. DUDAS
*Acting Director of the United States Patent and Trademark Office*